Aug. 29, 1939.     A. G. HILLMAN     2,171,269
CAMERA
Filed Sept. 4, 1937
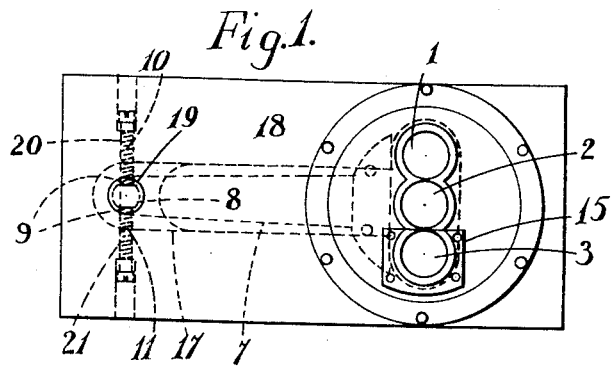
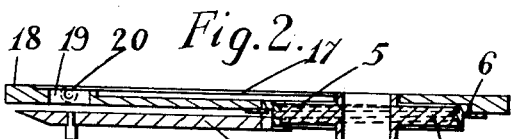
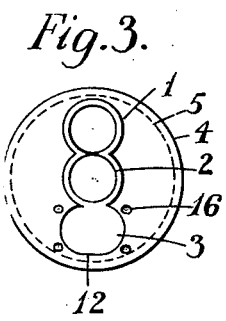 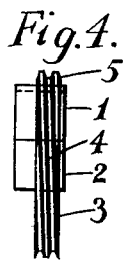 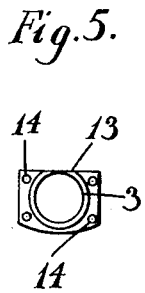 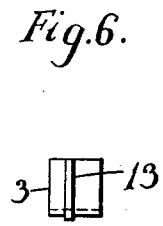
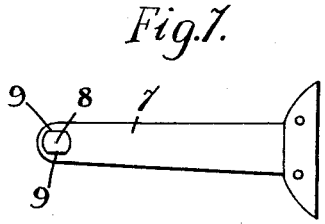
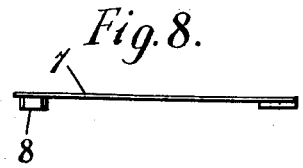
INVENTOR
Albert George Hillman
BY
Albert F. Nathan
ATTORNEY Patented Aug. 29, 1939

2,171,269

UNITED STATES PATENT OFFICE 2,171,269

CAMERA

Albert George Hillman, Maidenhead, England

Application September 4, 1937, Serial No. 162,455
In Great Britain September 9, 1936

7 Claims. (Cl. 88—16.4)

The present invention relates to cameras employing a plurality of lenses, and more especially to cameras for use in colour photography or kinematography. One of the objects of the present invention is to permit adjustment of the lenses to bring them into the desired relationship with the image-receiving surface, e. g., the film used in a cinematograph camera, and to provide an improved means for focussing the lenses whereby this setting will not be interfered with as a result of slackness, for example, due to wear, in the focussing mechanism.

In order to enable the lenses to be so adjusted and to be focussed as a unit I mount them in a mount which is rotatable for effecting the adjustments but is arranged to be held against rotation when axially reciprocated for focussing. Difficulties, however, occur in maintaining the true position of the lenses in relation to the film under focussing conditions when ordinary focussing means are employed.

Modern focussing mechanism in which the lens mount is screw-threaded and engaged by a cooperating screw member in such a way that the screw-surfaces encircle the objective, the lens mount preferably being the screw and the actuating part the nut, in order to give a large surface of engagement so that there is little risk of such lost motion occurring between the screw surfaces as is liable to occur between a pin and a helical slot, and I would have it understood that my invention is confined to such screw-threaded mechanism. It is preferred to use a screw union having what is known as the Acme thread in which the threads taper outwardly and contact is made only at the sides and not at the top and bottom of the threads.

However, if two or more lenses are carried by the mount so that the centre of one or more of them is not co-incident with the axis of the screw and the lens mount be guided axially by a key and keyway in accordance with well-known practice, then if there be a very small amount of slackness between the key and keyway, due, for example, to wear of either the key or the keyway, an orbital or bodily movement may occur of such centre or centres about the axis of the mount, which changes the point of view of the lenses whilst focussing, and this is particularly so in the case of the outside lenses of a group of three or more aligned lenses. If for example, in a cinematograph camera, the lenses are being focussed in synchronism with the movement of a subject towards or away from the camera, this change in relationship of the optical centres of the lenses to the film gate gives rise to lateral and vertical wanderings of the picture. This in turn will result in lack of registration of the colour constituent images, even where they are taken by exposure of the image receiving areas on the film to branch beams, formed by a light dividing system, of a single main beam, and whether the negatives are used subsequently for either the additive or subtractive colour methods.

This disadvantage is mitigated by the present invention by providing fine adjusting means for partially rotating the said mount about the axis of its screw surface so as to turn one or one or more of the objectives bodily about such axis for controlling the arrangement of the images cast by the said objectives on the image-receiving surface, said means serving to restrain the mount against rotation whilst it is being moved axially during focussing. Any slackness can thereby be taken up. In the hereinafter described form a fine adjusting means in the form of a screw control is provided but a fine wedge or other means can be used which can translate a considerable amount of movement imparted to it into a very small amount of movement to the part it actuates. The screws may serve positively to grip a spring arm whose other end is fast with the lens mount, or a rigid member or arm fast with the lens mount may be employed which is free to advance axially with the lens mount in rubbing or close contact with the adjustable means, or with guides adjusted thereby. It is preferred to make the arm sufficiently long and so to arrange the adjusting means that the said means act at a considerable distance from the axis of rotation of the screw mount so that any slight slackness that may arise results in a practically negligible rotation of the mount, as substantial arcuate movement at the point of adjustment involves only small arcuate movement of the centre of the lenses.

In the preferred form of the invention the mount is a screw apertured to receive the objectives and an axially immovable surrounding nut acts as the rotatable member for axially moving the screw for focussing.

The adjustable means serve to give a fine control of the initial adjustment and subsequent maintenance of the lenses in alignment with each other and the film gate.

The accompanying drawing illustrates by way of example a focussing apparatus suitable for a cinematograph camera for producing negatives for the three-colour process of colour cinematography.

In the drawing, Fig. 1 is a front view of the apparatus and Fig. 2 is a sectional plan thereof; Fig. 3 is a front view and Fig. 4 a side view of the mount for the objectives: Fig. 5 is a front view and Fig. 6 is a side view of one of the objectives on a carrier plate which is intended to be fitted to the mount and be adjustable thereon, and Figs. 7 and 8 are views of the spring arm through which the adjustments of the mount are made.

The apparatus illustrated comprises three lenses 1, 2, 3, arranged one below the other, the middle and one outer, say the top, lens being fixedly located in a lens mount 4 which is provided with an external thread 5, e. g., an Acme thread, which is engaged by a rotatable, but axially restrained, nut 6 encircling the lens mount, and by means of which the lens mount can be axially displaced.

Projecting laterally from the mount, e. g., from one end face thereof, is a flat spring arm 7, from one face of which, at or near the free end of the arm, a pin 8 projects having opposed flat facets 9. Opposed screws 10, 11 act on such facets and by adjusting these screws the lens mount can be rotated to bring the centres of the two fixed lenses into true verticality, or alignment with the axis of the film through the gate, which can be tested photographically by known methods.

The lower lens is mounted for slidable movement laterally of the camera along a chord of the lens mount. For this purpose the receiving aperture 12 for such lens in the mount is laterally elongated, and the lens is mounted on a carrier plate 13 which has corner holes 14 to receive small set screws 15 which extend into holes 16 in the lens mount which register with the holes in the carrier but are laterally elongated. The lens and its carrier are therefore free for a limited lateral movement and this can be effected by the actuating arm 7 of the lens mount in the following way.

The vertical position of the line joining the optical centres of the two fixed lenses having been determined by means of the arm 7 and screws 10, 11, one only of the two arm adjusting screws can be slackened to allow the arm to be rotated in one direction. If the centre of the movable lens is found to be not in vertical alignment with the centres of the other lenses the corner set screws 15 may be slackened slightly, as will be that one of the arm-actuating screws which enables the lens mount to be rotated by means of the arm 7 to cause the movable lens to move laterally in the appropriate direction. For effecting this lateral movement of the lens, it is convenient to provide a stop to prevent such lens from partaking of rotary movement with the lens mount while this is being rotated. The stop may act on either side of the movable lens carrier according to the direction in which it is necessary to correct the movable lens, the movable lens carrier maintaining slide-guided contact with the base of the second lens housing during the adjustment. The stop may be arranged to engage a cylindrical wall of the movable lens casing so that the latter can roll slightly on the stop. When the centres of all three lenses have thus been brought into alignment or as near alignment as possible, the set screws 15 are tightened and the lens mount is reversely rotated up to the unslackened screw and the slackened screw is returned to locking position. Photographic tests can be taken and further slight adjustment made if necessary under their guidance until the desired true alignment of the lenses in a vertical position is achieved.

When the arm 7 is locked by the screws 10, 11 it will be positively held against rotation but the elasticity of the arm will allow its end attached to the lens mount to move with the latter when the mount is moved axially for simultaneously focussing the three lenses. The spring arm 7 may be suitably curved or bent or looped to facilitate this action. The mount is thereby firmly held against undesired rotation during focussing. In lieu of using a spring arm, a rigid arm can be used in which case the screws would be brought into such engagement with the arm as to permit its free end to move with rubbing contact against the corresponding ends of the screws, or with the guides controlled by screws.

In the case of short focus lens the displacement of the lens between infinity and 6 feet is generally only about .027 inch, consequently the spring arm 7 can nicely accommodate such movement but greater movements of longer focus lenses can be better accommodated by the slide guided movement of the rigid arm.

The arm may work in a groove 17 in a mounting plate 18 for the lens mount and nut, the pin 8 preferably being arranged to project into a hole 19 in the plate near the end of the groove and the adjusting screws working in threaded bores 20, 21 extending transversely from each side of the groove.

The mount actuating nut 6 may be provided with a pointer 22 working over a suitable dial.

The present camera may be used for producing on a single film a series of colour selection negatives from which a positive can be produced for projection through appropriate colour filters. Or from such a single negative matrice films may be obtained for each of the separate colour values by, for example, using a printer in which the basic film is pulled down two or more pictures at each pull (three in the case of a three-colour process), and the film to be printed is pulled down one picture at each pull.

Although the invention has been described more particularly in regard to cameras for producing colour selection negatives, it may be used without colour filters for producing ordinary black and white effects. The multiple lens arrangement when used in conjunction with a light dividing system enables pictures to be taken simultaneously and the arrangement is particularly well suited also for taking two or more pictures in rapid succession from the same or substantially the same point of view as in the process according to my co-pending application Serial No. 154,863 filed July 21, 1937, in which case the positive obtained can be projected with a single picture pull projector so that only a small different motion analysis is present between each pair or group of successive pictures which have been taken at different stationary periods of the film. This tends to reduce the tendency for multiple images of a rapidly moving object to become observable on the screen.

In lieu of rotating the movable lens and its carrier by the projecting arm of the lens mount, the adjustment may be effected by opposed screws acting directly or indirectly on the movable lens or its carrier.

In the form described two of the lenses are fixed in the mount, but independent focussing of the three lenses may be provided for, such as by making each lens axially movable under the control of opposing screws. A simple form of screw control is obtained by forming screw holes along the tubular mount of the lens tube and arranging for heads of screws which screw therein each to push on an end wall of a marginal recess in the lens tube. One screw is provided at each end so that the tube can be pushed in either direction and locked in the desired adjusted position. The middle lens would generally be first positioned in the mount and correctly focussed and the top and lower lenses then focussed, all three lenses being finally checked by photographic tests made through a range of filters and the best position selected for as near equal size of images and definition of pictures as possible.

What I claim is—

1. A screw operated focussing mount for a cinematographic or photographic camera, comprising a plurality of objectives, a screw-threaded mount therefor, a co-operating screw member for axially displacing said mount for simultaneously focussing said objectives, the co-operating screw surfaces of said mount and member encircling the axes of the objectives, a member fixed to the said mount and opposing members co-operating with said latter member for positively restraining the mount against rotation whilst it is being moved axially during focussing, at least a portion of said member fixed to the mount being movable relatively to said opposing members in the direction of the axis of the mount to permit of focussing movement of said mount, supports for said opposing members, said members being adjustable in relation to said supports for partially rotating the said fixed member and the mount when required about the axis of the screw surface of the mount so as to turn at least one of said objectives bodily about such axis for controlling the arrangement of the images cast by the said objectives on the image-receiving surface.

2. A screw operated focussing mount for a cinematographic or photographic camera, comprising a plurality of objectives, a screw threaded mount therefor, a co-operating screw member for axially displacing said mount for simultaneously focussing said objectives, said screw surfaces encircling said objectives, said mount having fixed to it an arm including a portion projecting outwardly considerably beyond said screw surfaces, opposing members co-operating with said arm for positively restraining the arm and therefore the mount against rotation whilst they are being moved axially during focussing, at least a portion of said arm being movable relatively to said opposing members in the direction of the axis of the mount during focussing, supports for said opposing members, said members being adjustable with reference to said supports for partially rotating the said mount about the axis of its screw surface so as to turn at least one of said objectives bodily about such axis for controlling the arrangement of the images cast by said objectives on the image-receiving surface, said opposing members acting upon said outwardly projecting portion of said arm so as to operate at a distance from said axis which is considerably greater than the distance between such axis and the centre of the objective which is rotatable bodily thereabout so that the arcuate movement of the arm at the point of adjustment is considerably greater than the arcuate movement of such centre.

3. A screw operated focussing mount for a cinematographic or photographic camera, comprising a plurality of objectives, an apertured screw threaded mount for housing said objectives, a co-operating screw-nut for axially displacing said mount for simultaneously focussing the objectives, a blade spring arm fixed to said mount and opposed members for holding said arm therebetween positively against rotation so as to prevent the mount from rotating during focussing, said blade spring arm being arranged so as to flex during focussing about the point at which it is held by the opposing members and in the direction of the axis of the mount, supporting means for said members, said members being adjustable relatively to said supporting means in such a manner as to permit said arm and mount to be rotated when required for controlling the arrangement of the images cast by the objectives on the image-receiving surface.

4. A screw operated focussing mount for a cinematographic or photographic camera, comprising a plurality of objectives, an apertured screw threaded mount for housing said objectives, a co-operating screw-nut for axially displacing said mount for simultaneously focussing the objectives, an arm fixed to said mount, said arm including a portion which projects outwardly considerably beyond the co-operating screw surfaces of said mount and said nut, opposing screws holding one end of said arm against movement so as to prevent the mount from rotating during focussing, said arm being in the form of a blade spring whose end attached to the mount can flex in the direction of the axis of the mount, said screws acting on said outwardly projecting portion of said arm and thereby at a distance from the axis of the mount which is considerably greater than the distance from said axis to the centre of at least one of said objectives, supports for said screws, said screws being adjustable relatively to said supports for permitting said arm and mount to be rotated when required for controlling the arrangement of the images cast by the objectives on the image receiving surface.

5. A screw operated focussing mount for a cinematographic or photographic camera, comprising a plurality of objectives, a screw threaded mount therefor, a co-operating screw member for axially displacing said mount for simultaneously focussing said objectives, said screw surfaces encircling said objectives so as to provide a large surface of screw engagement, an arm fixed to said mount, said arm including a portion which projects outwardly considerably beyond said screw surfaces, opposed screws for guiding said arm in movement with the mount axially of the latter and restraining said arm and the mount against rotation whilst they are being moved axially during focussing, supporting means for said screws, said screws being adjustable relatively to said supporting means for partially rotating the said mount when required about the axis of its screw surfaces so as to turn at least one of said objectives bodily about such axis for controlling the arrangement of the images cast by the said objectives on the image-receiving surface, said screws acting on said outwardly projecting portion of said arm and thereby at a distance from the said axis which is considerably greater than the distance between said axis and the centre of the objective which is movable bodily thereabout, so as to ensure that arcuate movement of the arm at the position of adjustment is considerably greater than the arcuate movement of such centre.

6. A screw operated focussing mount for a cinematographic or photographic camera, comprising at least three objectives, a screw threaded mount therefor, a co-operating screw member for axially displacing said mount for simultaneously focussing said objectives, the co-operating screw surfaces of said mount and said member encircling the axes of said objectives, a member fixed to said mount and opposed members co-operating with said fixed member for positively restraining the mount against rotation whilst it is being moved axially during focussing, at least a portion of said member fixed to the mount being movable relatively to said opposing members in the direction of the axis of the mount to permit of focussing movement of said mount, supporting means for said opposed members, said opposed members being adjustable relatively to said supporting means for rotating the said mount when required about the axis of its screw surface so as to turn at least one of said objectives bodily about such axis for controlling the arrangement of the images cast by the said objectives on the image-receiving surface, two of said objectives being fixed to the mount and at least one being movable in relation to the fixed objectives, and means for so adjusting said movable objective laterally of the line joining the centres of the fixed objectives for obtaining alignment of the centres of all the objectives.

7. A screw operated focussing mount for a cinematographic or photographic camera, comprising at least three objectives a screw threaded mount therefor, a co-operating screw member for axially displacing said mount for simultaneously focussing said objectives, the co-operating screw surfaces of said mount and said member encircling the axes of said objectives, a member fixed to said mount, and opposed members co-operating with said latter member for positively restraining the mount against rotation whilst it is being moved axially during focussing, at least a portion of said member fixed to the mount being movable relatively to said opposing members in the direction of the axis of the mount to permit of focussing movement of said mount, mounts for said opposed members, said members being adjustable relatively to said mounts for partially rotating the said screw threaded mount about the axis of its screw surface so as to turn at least one of said objectives bodily about such axis for controlling the arrangement of the images cast by the said objectives on the image-receiving surface, two of said objectives being fixed, and at least one being movable relatively thereto, an opening in said mount which is elongated laterally of the line joining the centres of the fixed objectives, said movable objective being mounted in and slidable along said elongated opening, and set screws for retaining the said movable objective in any adjusted position along said opening.

ALBERT GEORGE HILLMAN.